US012567019B2

(12) United States Patent　　(10) Patent No.:　US 12,567,019 B2
Aggarwala et al.　　(45) Date of Patent:　*Mar. 3, 2026

(54) CONTAINER DEVICE AND DELIVERY SYSTEMS FOR USING THE SAME

(71) Applicant: Google LLC, Mountain View, CA (US)

(72) Inventors: Rohit Thomas Aggarwala, New York, NY (US); Sandra Rothbard, New York, NY (US); Corinna Li, Toronto (CA); Willa Ng, New York, NY (US); Jiten Manglani, New York, NY (US); Landry Doyle Wiese, New York, NY (US); Nerissa Moray, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/913,554

(22) Filed: Oct. 11, 2024

(65) Prior Publication Data

US 2025/0078013 A1　　Mar. 6, 2025

Related U.S. Application Data

(63) Continuation of application No. 16/905,125, filed on Jun. 18, 2020, now Pat. No. 12,147,929.

(Continued)

(51) Int. Cl.
*G06Q 10/0832*　　(2023.01)
*A47G 29/14*　　(2006.01)
(Continued)

(52) U.S. Cl.
CPC ....... *G06Q 10/0832* (2013.01); *A47G 29/141* (2013.01); *G06F 16/901* (2019.01);
(Continued)

(58) Field of Classification Search
CPC .................................................. G06Q 10/0832
(Continued)

(56) References Cited

U.S. PATENT DOCUMENTS 6,622,127 B1 *　9/2003　Klots ................. G06Q 30/0641
　　　　　　　　　　　　　　　　　705/28
10,909,648 B2　2/2021　Ibe
(Continued)

FOREIGN PATENT DOCUMENTS

JP　　　　2019006550 A　　1/2019

OTHER PUBLICATIONS

"Robotic Forklifts for Intelligent Warehouses: Routing, Path Planning, and Auto-localization," by Kelen C.T. Vivaldini, Jorge P. M. Galdames, Thales S. Bueno, Roberto C. Araujo, Rafael M. Sobral, Marcelo Becker, and Glauco A. P. Caurin, p. 1463-1469, Mar. 14-17, 2010 (Year: 2010).*
(Continued)

*Primary Examiner* — Michael P Harrington
*Assistant Examiner* — Brian Adams Heflin
(74) *Attorney, Agent, or Firm* — Lerner David LLP

(57)　　　　ABSTRACT

Container devices and delivery systems for using the same are provided. In accordance with some embodiments of the disclosed subject matter, a method for delivering packages is provided that includes: receiving, at a delivery hub, a first package to be delivered to a recipient; causing the first package to be placed in a container to be delivered to the recipient; associating an identifier of the first package and an identifier of the container with the recipient; determining, at a first time point, whether the container is ready to be delivered to the recipient; in response to determining that the container is not ready to be delivered to the recipient, waiting for a second package to be delivered to the recipient; receiving the second package to be delivered to the recipi- (Continued)

ent; causing the second package to be placed in the container; associating an identifier of the second package with the identifier of the container; determining, at a second time point, whether the container is ready to be delivered to the recipient; and, in response to determining that the container is ready to be delivered to the recipient, causing the container to be loaded onto a delivery vehicle.

20 Claims, 8 Drawing Sheets

Related U.S. Application Data

(60) Provisional application No. 62/862,971, filed on Jun. 18, 2019.

(51) Int. Cl.

| | |
|---|---|
| *G06F 16/901* | (2019.01) |
| *G06Q 10/0631* | (2023.01) |
| *G06Q 10/083* | (2024.01) |
| *G06Q 10/0834* | (2023.01) |
| *G06Q 10/087* | (2023.01) |
| *G07C 9/00* | (2020.01) |
| *G07C 9/22* | (2020.01) |
| *G07C 9/27* | (2020.01) |

(52) U.S. Cl.
CPC ... *G06Q 10/06312* (2013.01); *G06Q 10/0834* (2013.01); *G06Q 10/0838* (2013.01); *G06Q 10/087* (2013.01); *G07C 9/00309* (2013.01); *G07C 9/00571* (2013.01); *G07C 9/00896* (2013.01); *G07C 9/22* (2020.01); *G07C 9/27* (2020.01); *A47G 2029/146* (2013.01); *G07C 2009/0092* (2013.01)

(58) Field of Classification Search
USPC ................................................ 705/7.22, 330
See application file for complete search history.

(56) References Cited

U.S. PATENT DOCUMENTS

| | | | | |
|---|---|---|---|---|
| 11,180,069 | B2 * | 11/2021 | Jarvis | G06Q 10/08 |
| 2005/0038710 | A1 * | 2/2005 | Zimmerman | G06Q 10/083 |
| | | | | 705/26.1 |
| 2005/0149453 | A1 | 7/2005 | Amling et al. | |
| 2006/0025883 | A1 * | 2/2006 | Reeves | G06Q 10/08 |
| | | | | 700/216 |
| 2009/0222129 | A1 | 9/2009 | Waddington et al. | |
| 2016/0368643 | A1 * | 12/2016 | Serjeantson | B65B 57/06 |
| 2018/0150790 | A1 * | 5/2018 | White | G06Q 10/087 |
| 2019/0066032 | A1 | 2/2019 | Taveira et al. | |
| 2020/0202290 | A1 | 6/2020 | Lo et al. | |
| 2020/0372437 | A1 * | 11/2020 | Kim | G06Q 10/063114 |
| 2021/0304539 | A1 * | 9/2021 | Simms | G07C 9/00896 |
| 2024/0043212 | A1 * | 2/2024 | Douglas | B25J 9/0093 |

OTHER PUBLICATIONS

"Anyware Robotics unveils truck-unloading robot arm," by Robotics, Feb. 7, 2024 (Year: 2024).*
"Amazon's robot arms break ground in safety and technology," by Alan S. Brown, Apr. 6, 2021 (Year: 2021).*
"First Look at Amazon's new robotic fulfillment hub in Mass," by Dan Berthiaume, Apr. 17, 2024 (Year: 2024).*
"Dolly," Merriam-Webster, Feb. 12, 2016 (Year: 2016).
"New robotic system could lend a hand with warehouse sorting and other picking or clearing tasks," by Jennifer Chu, Feb. 20, 2018 (Year: 2018).
"Automating Dolly Positioning and Pallet Pocket Detection Tasks in Distribution Centers," by Sick, Sep. 28, 2020.
"Using A Robot Dolly To Revolutionizing Material Handling and Film," by Ralph, Apr. 16, 2024.

* cited by examiner

UNFOLDS FOR EFFICIENT
FLAT STORAGE

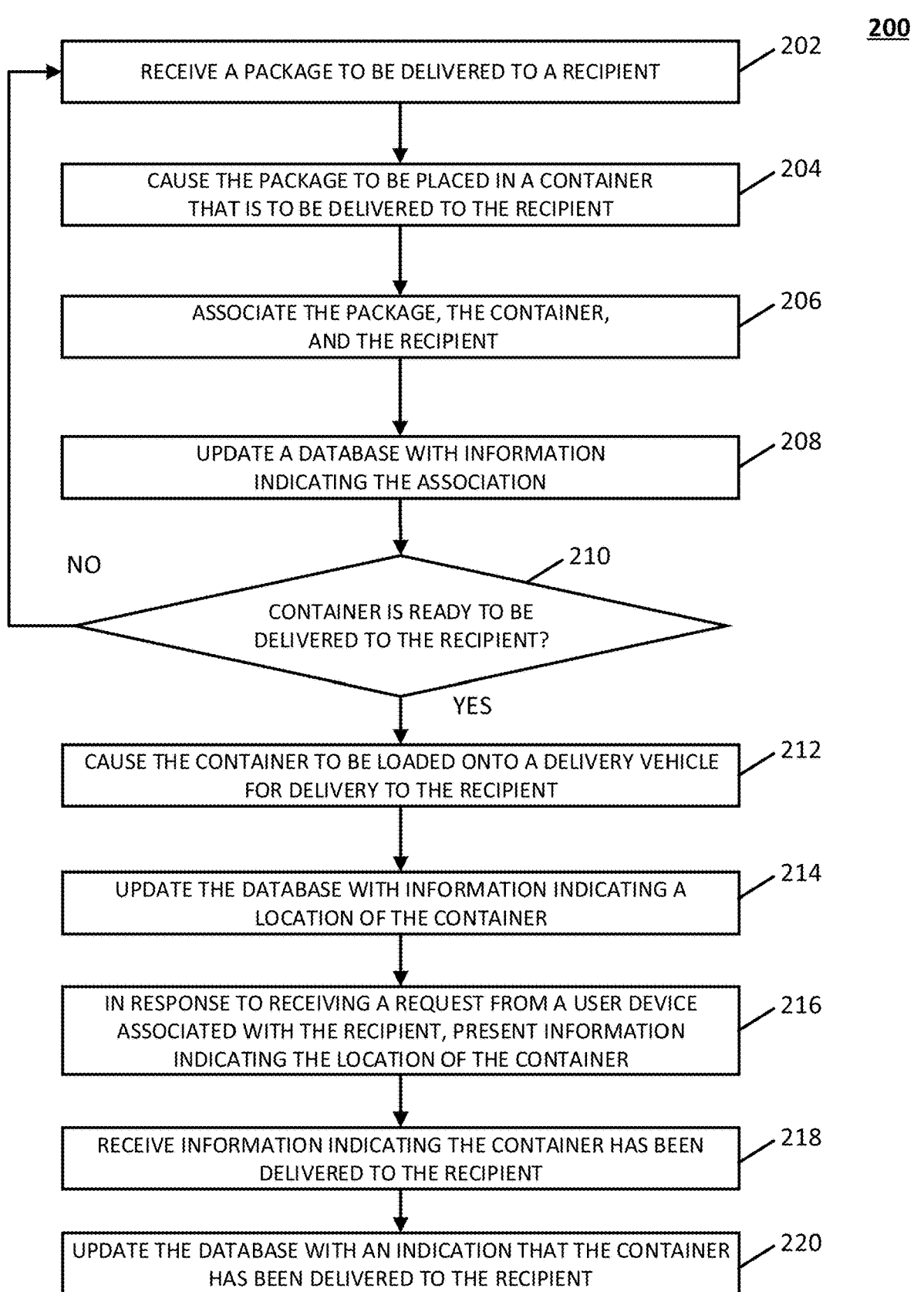

200

202 — RECEIVE A PACKAGE TO BE DELIVERED TO A RECIPIENT

204 — CAUSE THE PACKAGE TO BE PLACED IN A CONTAINER THAT IS TO BE DELIVERED TO THE RECIPIENT

206 — ASSOCIATE THE PACKAGE, THE CONTAINER, AND THE RECIPIENT

208 — UPDATE A DATABASE WITH INFORMATION INDICATING THE ASSOCIATION

210 — CONTAINER IS READY TO BE DELIVERED TO THE RECIPIENT?

NO

YES

212 — CAUSE THE CONTAINER TO BE LOADED ONTO A DELIVERY VEHICLE FOR DELIVERY TO THE RECIPIENT

214 — UPDATE THE DATABASE WITH INFORMATION INDICATING A LOCATION OF THE CONTAINER

216 — IN RESPONSE TO RECEIVING A REQUEST FROM A USER DEVICE ASSOCIATED WITH THE RECIPIENT, PRESENT INFORMATION INDICATING THE LOCATION OF THE CONTAINER

218 — RECEIVE INFORMATION INDICATING THE CONTAINER HAS BEEN DELIVERED TO THE RECIPIENT

220 — UPDATE THE DATABASE WITH AN INDICATION THAT THE CONTAINER HAS BEEN DELIVERED TO THE RECIPIENT

FIG. 2

TYPICAL DUAL FREIGHT TUNNEL SECTION

CONTAINER DEVICE AND DELIVERY SYSTEMS FOR USING THE SAME

CROSS REFERENCE TO RELATED APPLICATIONS

This application is a continuation of U.S. application Ser. No. 16/905,125, filed Jun. 18, 2020, which claims the benefit of U.S. Provisional Patent Application No. 62/862,971, filed Jun. 18, 2019, the disclosures of which are hereby incorporated by reference.

TECHNICAL FIELD

The disclosed subject matter relates to a container device and delivery systems for using the same.

BACKGROUND

Freight vehicles are used to deliver many types of goods. However, freight vehicles making deliveries to businesses and residences can cause traffic congestion and other problems. In particular, the last-mile of a delivery, where items are handed off to consumers or businesses, is a significant contributor to freight-related congestion, for several reasons. For example, there is often insufficient parking for a delivery vehicle outside of a residence or business, and a driver of the delivery vehicle may therefore double park in a street while making a delivery, resulting in traffic congestion. Additionally, deliveries may be attempted when a resident is not at home, which results in a failed delivery and thus require multiple subsequent delivery attempts.

Accordingly, it is desirable to provide new container devices and delivery systems for using the same.

SUMMARY

Container devices and delivery systems for using the same are provided.

In accordance with some embodiments of the disclosed subject matter, a method for delivering packages is provided, the method comprising: receiving, at a delivery hub, a first package to be delivered to a recipient; causing the first package to be placed in a container to be delivered to the recipient; associating an identifier of the first package and an identifier of the container with the recipient; determining, at a first time point, whether the container is ready to be delivered to the recipient; in response to determining that the container is not ready to be delivered to the recipient, waiting for a second package to be delivered to the recipient; receiving the second package to be delivered to the recipient; causing the second package to be placed in the container; associating an identifier of the second package with the identifier of the container; determining, at a second time point, whether the container is ready to be delivered to the recipient; and, in response to determining that the container is ready to be delivered to the recipient, causing the container to be loaded onto a delivery vehicle.

In some embodiments, the container has a lock associated with a password corresponding to the recipient.

In some embodiments, determining, at the second time point, whether the container is ready to be delivered to the recipient is based on a storage temperature of the second package.

In some embodiments, the method further comprises: storing, in a database, the identifier of the first package, the identifier of the second package, and the identifier of the container in connection with a time at which the container was loaded onto the delivery vehicle; receiving information indicating that the container has been delivered to the recipient; and updating the database with the information indicating that the container has been delivered to the recipient.

In some embodiments, the method further comprises: receiving a request to present information associated with the container from a user device associated with the recipient; retrieving information associated with the container from the database; and causing the information associated with the database to be presented in a user interface on the user device.

In some embodiments, determining, at the first time point, whether the container is ready to be delivered to the recipient is based on a number of packages expected for the recipient.

In some embodiments, the first package and the second package are delivered to the delivery hub via different delivery services.

In accordance with some embodiments of the disclosed subject matter, a system for delivering packages is provided, the system comprising a hardware processor that: receives, at a delivery hub, a first package to be delivered to a recipient; causes the first package to be placed in a container to be delivered to the recipient; associates an identifier of the first package and an identifier of the container with the recipient; determines, at a first time point, whether the container is ready to be delivered to the recipient; in response to determining that the container is not ready to be delivered to the recipient, waits for a second package to be delivered to the recipient; receives the second package to be delivered to the recipient; causes the second package to be placed in the container; associates an identifier of the second package with the identifier of the container; determines, at a second time point, whether the container is ready to be delivered to the recipient; and, in response to determining that the container is ready to be delivered to the recipient, causes the container to be loaded onto a delivery vehicle.

In accordance with some embodiments of the disclosed subject matter, a non-transitory computer-readable medium containing computer executable instructions that, when executed by a processor, cause the processor to perform a method for delivering packages is provided, the method comprising: receiving, at a delivery hub, a first package to be delivered to a recipient; causing the first package to be placed in a container to be delivered to the recipient; associating an identifier of the first package and an identifier of the container with the recipient; determining, at a first time point, whether the container is ready to be delivered to the recipient; in response to determining that the container is not ready to be delivered to the recipient, waiting for a second package to be delivered to the recipient; receiving the second package to be delivered to the recipient; causing the second package to be placed in the container; associating an identifier of the second package with the identifier of the container; determining, at a second time point, whether the container is ready to be delivered to the recipient; and, in response to determining that the container is ready to be delivered to the recipient, causing the container to be loaded onto a delivery vehicle.

In accordance with some embodiments of the disclosed subject matter, a system for delivering packages is provided, the system comprising: means for receiving, at a delivery hub, a first package to be delivered to a recipient; means for causing the first package to be placed in a container to be delivered to the recipient; means for associating an identifier of the first package and an identifier of the container with the recipient; means for determining, at a first time point, whether the container is ready to be delivered to the recipient; means for waiting for a second package to be delivered to the recipient in response to determining that the container is not ready to be delivered to the recipient; means for receiving the second package to be delivered to the recipient; means for causing the second package to be placed in the container; means for associating an identifier of the second package with the identifier of the container; means for determining, at a second time point, whether the container is ready to be delivered to the recipient; and means for causing the container to be loaded onto a delivery vehicle in response to determining that the container is ready to be delivered to the recipient.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 2 shows an illustrative example of a process for managing shipping devices and deliveries in accordance with some embodiments of the disclosed subject matter.

DETAILED DESCRIPTION

Figure 1A:
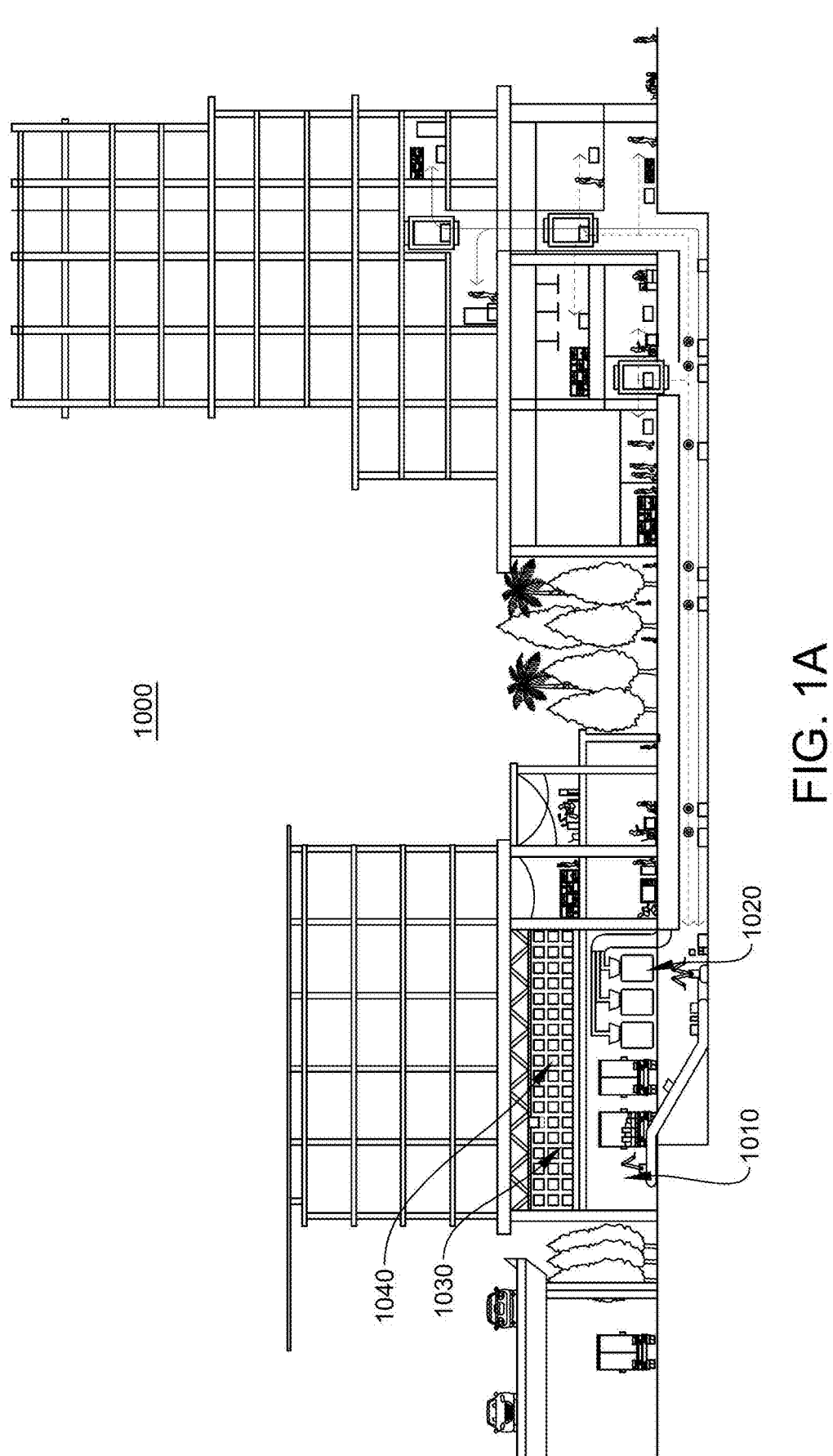
FIG. 1A shows an illustrative example of container devices in a neighborhood logistics hub in accordance with some embodiments of the disclosed subject matter.

In accordance with various embodiments, a container device and delivery systems for using the same are provided.

In some embodiments, the mechanisms described herein can be used to facilitate shipping and delivery of goods. For example, as shown in and described below in connection with FIGS. 1A-1D, packages, parcels, and/or other items can be placed in container devices, which can then be delivered to an end recipient. In some such embodiments, a container device can be a smart container device and can include any suitable features that allow for secure access to the container device and the contents of the container device, tracking of the container device as it is moved from a logistics hub to an end recipient, and/or any other suitable features. For example, as shown in and described below in connection with FIGS. 1B-1D, the container device can include a lock (e.g., a digital lock, and/or any other suitable type of lock) that can allow the container device to be opened (and, therefore, allow access to content stored in the container device) by an intended delivery recipient or a user designated by the recipient. This can, for example, ensure the security of a package or parcel placed within the security device and reduce the prevalence of stolen deliveries. As another example, in some embodiments, the container device can include a barcode or an RFID chip that can allow the container device to be identified and tracked as it is moved from a logistics hub to an end recipient.

In some embodiments, the mechanisms described herein can be used at a logistics hub that is used to deliver packages, parcels, mail, and/or any other suitable deliveries to end recipients (e.g., businesses, residences, and/or any other suitable type of end recipient). For example, as shown in and described below in connection with FIGS. 1A and 2, the mechanisms described herein can identify packages, parcels, mail, and/or other items that arrive at the logistics hub (e.g., via one or more delivery trucks), and can cause the packages, parcels, mail, and/or other items to be sorted in any suitable manner. In some embodiments, the mechanisms can then cause packages or other items to be placed in one or more container devices such that each container device includes packages or items to be delivered to a particular recipient. For example, as described below in connection with FIG. 2, the mechanisms can determine that a container device that includes a first package to a particular recipient is not to be delivered to the recipient until a second package is also placed in the container device, thereby consolidating multiple items to be delivered to the recipient and reducing the number of deliveries to a particular recipient.

As another example, in some embodiments, as shown in and described below in connection with FIG. 2, the mechanisms can cause a container device that includes one or more items to be delivered to a recipient to be loaded onto a delivery vehicle. Note that, in some embodiments, as described more in connection with FIG. 2, the delivery vehicle can be any suitable type of delivery vehicle, such as an autonomous vehicle, a semi-autonomous vehicle, a manned vehicle, and/or any other suitable type of vehicle. Additionally, in some embodiments, the delivery vehicle can travel in any suitable manner. For example, in some embodiments, the delivery vehicle can be an autonomous robotic dolly that is configured to travel through one or more underground tunnels that connects a network of buildings, thereby leaving above-ground streets and roads clear of last-mile delivery vehicles.

As yet another example, in some embodiments, as shown in and described below in connection with FIG. 2, the mechanisms can associate (1) a unique identifier that is associated with a container device containing an item to be delivered to a recipient with (2) a unique identifier of the item and (3) a unique identifier of the recipient and can store information indicating the association in any suitable manner (e.g., by creating a new entry in a secure database that is used to store information associated with deliveries, and/or in any other suitable manner). In some embodiments, the mechanisms can then update information associated with the container device, such as information indicating a robotic dolly that has been assigned to transport the container device, timing information as to when the container device will be picked up or delivered, information indicating a current location of the container device, information indicating a route through the underground tunnels to deliver the container device, information regarding the contents of the container, and/or any other suitable information.

Note that, in some embodiments, information about a delivery and/or a container device that includes an item to be delivered to a recipient can be accessed in any suitable manner. For example, in some embodiments, the logistics hub can be associated with an application (e.g., an application that executes on a user device, and/or any other suitable type of application) that provides information to users indicating any suitable delivery information. For example, as described below in connection with FIG. 2, in some embodiments, the application can be used to present an indication of a current location of a container device that includes a package to be delivered to a recipient. In some such embodiments, the current location of the container device can be updated as the container device travels from the logistics hub to the recipient. As another example, in some embodiments, the application can be used by the recipient to receive or set a code that is used to actuate a lock of a container device. As yet another example, in some embodiments, the application can be used by the recipient to indicate an alternate recipient (e.g., a friend of the recipient, and/or any other suitable alternate recipient) who is to receive a delivered package.

Note that, in some embodiments, the application, the logistics hub, and tracking information associated with a container device or delivery of a container device can each be associated with a central database system. For example, in some embodiments, an application executing on a user device can access the central database to retrieve tracking information associated with a container device that contains a delivery for a user of the user device. As another example, in some embodiments, a device associated with the logistics hub can access the central database system to update a database with any suitable information related to deliveries, container devices, and/or any other suitable information. As a more particular example, in some embodiments, the device associated with the logistics hub can update the central database system to indicate that a delivery for a particular recipient has been placed in a container device associated with a particular container identifier. As another more particular example, in some embodiments, the device associated with the logistics hub can update the central database system to indicate that a container device associated with a particular container identifier has left the logistics hub for delivery to the recipient at a particular time.

Note that, although the mechanisms described herein are generally used to describe delivery of items from a logistics hub to an end recipient, in some embodiments, the mechanisms described herein can be used to transport items from an end recipient to the hub. For example, in some embodiments, the mechanisms described herein can be used to transport waste (e.g., items to be recycled, trash, and/or any other suitable items) from a resident of a building to a hub for sorting and/or disposal as shown in FIG. 1A. As a more particular example, in some embodiments, the container devices and/or the delivery vehicles described herein can be used to hold and transport items from a resident of a building to the hub. As another example, in some embodiments, the mechanisms described herein can be used to access items stored at a centralized hub as shown in FIG. 1A. As a more particular example, in some embodiments, a centralized hub can be used as a storage facility for residents of one or more buildings in a geographical region, and, in some embodiments, items stored at the centralized hub can be retrieved from the hub using the mechanisms described herein. As a specific example, in some embodiments, a resident can store one or more particular items in a container device associated with an identifier, and the container device can then be stored at the hub. Continuing with this example, in some embodiments, the resident can then select the container device using the identifier (e.g., via an application associated with the hub, and/or in any other suitable manner), and can request that the container device be delivered to the recipient using, for example, the autonomous delivery vehicles described herein.

Additionally, note that, in some embodiments, the mechanisms described herein can be used by a commercial or retail entity to deliver and/or store items (e.g., inventory of a retail business, and/or any other suitable items). For example, in some embodiments, the mechanisms described herein can be used by a commercial or retail entity to store items in a central location and/or to retrieve the stored items from the central location at any suitable time. As another example, in some embodiments, the mechanisms described herein can be used by a commercial or retail entity to deliver items to customers.

Although the mechanisms described herein are generally described as using a central logistics hub to coordinate delivery of packages or items, in some embodiments, the mechanisms described herein can be used to deliver a package or an item from one entity (e.g., a residential entity, a commercial entity, a retail entity, etc.) to another entity (e.g., a residential entity, a commercial entity, a retail entity, etc.) without the package or item passing through the central logistics hub. For example, in some embodiments, a package or item sender can arrange for pickup of the package or the item (e.g., using the application described above). In some such embodiments, a delivery vehicle can then arrive at an address or location associated with the package or item sender to pick up the package or item. In some embodiments, the delivery vehicle can then go to an address or location associated with the package or item recipient to deliver the package or item. Note that, in some embodiments, the delivery vehicle can be any suitable type of vehicle (e.g., a truck, a car, a dolly, etc.) and can be manually operated, semi-autonomous, or autonomous.

These and other features of the container device and delivery systems for using the same are further described below in connection with FIGS. 1A-5.

Turning to FIG. 1A, an illustrative example of container devices in a logistics hub is shown in accordance with some embodiments of the disclosed subject matter. As shown in FIG. 1A, in some embodiments, a logistics hub 1000 can be provided for, among other things, deliveries, waste, storage, and/or borrowing services. Such a logistics hub 1000 can, for example, centralize inbound and outbound deliveries by allowing carriers to bundle deliveries and drop them off at a single neighborhood location, thereby saving time and reducing the impact of truck trips on local streets.

In some embodiments, logistics hub 1000 can include a consolidation center 1010 that consolidates inbound and outbound deliveries in a single location. For example, as shown in FIG. 1A, consolidation center 1010 can receive and/or otherwise collect deliveries and prepare the deliveries for last-mile transport via one or more underground tunnels that connect consolidation center 1010 into one or more buildings. In a more particular example, consolidation center 1010 can receive inbound parcels from one or more delivery carriers at a single location. In continuing this example, the inbound parcels can be sorted (e.g., by address) and placed into a container device, such as the container devices described below in connection with FIGS. 1B-1D. In turn, the inbound parcels can be sent to their final destination within the neighborhood via the container devices. Conversely, one or more container devices that are inbound to consolidation center 1010 can transport parcels or deliveries for pickup by one or more delivery carriers.

It should be noted that consolidation center 1010 in logistics hub 1000 can be used, for example, to reduce the number of delivery vehicles coming into the neighborhood as delivery carriers would be able to consolidate deliveries into fewer delivery vehicles. It should also be noted that consolidation center 1010 in logistics hub 1000 can be used, for example, to improve conditions in and around a neighborhood (e.g., fewer delivery vehicles looking for parking, fewer failed delivery attempts, less fuel burning from multiple delivery vehicles, less lost time, etc.). It should further be noted that consolidation center 1010 in logistics hub 1000 can be used, for example, to allow delivery carriers to unload an entire delivery vehicle of inbound parcels and collect outbound parcels, thereby ensuring that delivery vehicles are moving efficiently and not consuming resources while being empty.

In some embodiments, logistics hub 1000 can include a waste consolidation site 1020 that consolidate various types of waste as a single location. This can, for example, reduce the presence of garbage pickup vehicles on local streets of the neighborhood. For example, as shown in FIG. 1A, waste consolidation site 1020 in logistics hub 1000 can receive waste from three separate streams corresponding to organic waste, recyclable waste, and landfill waste, respectively. In a more particular example, these separate streams of waste can be transported via a series of pneumatic or vacuum tubes to waste consolidation site 1020 in logistics hub 1000. In continuing this example, while landfill waste, organic waste, and metal, glass, and/or plastic waste may be transported from a residential building to waste consolidation site 1020 in logistics hub 1020 using underground vacuum tubes, certain types of recyclable waste, such as recyclable cardboard and other items that may not be suitable for transport through a vacuum tube system, can be transported to waste consolidation site 1020 in logistics hub 1020 using the neighborhood freight system that uses one or more container devices (e.g., the container devices described in FIGS. 1B-1D). It should also be noted that, in some embodiments, oversized waste may trigger a permitting process that requires direct pick-up of the oversized waste from the residential building or from the residence within the residential building.

In some embodiments, logistics hub 1000 can include an off-site storage service 1030 that enables residents and/or businesses in the neighborhood of logistics hub 1000 to store goods and have one or more stored goods retrieved and delivered on-demand. For example, a client application that corresponds to off-site storage service 1030 of logistics hub 1000 can be used by a user to order particular items being stored in off-site storage service 1030 for delivery to the residence associated with the user. In continuing this example, the client application can provide one or more user interfaces that present the individual items that a user has storage along with a personalized inventory list with images or accessible audio descriptions for retrieval. In a more particular example, the client application in connection with off-site storage service 1030 can be used by residents of the neighborhood for short-term storage of bulky cookware, luggage, and other items used occasionally and longer-term storage of items used seasonally, such as winter clothes or skating equipment. In another more particular example, the client application in connection with off-site storage service 1030 can be used by businesses in the neighborhood to reduce stockroom clutter. As such, retail stores in the neighborhood can act as showrooms with limited items placed within the storage and excess products stored off-site at off-site storage service 1030 of logistics hub 1000. It should be noted that, because off-site storage service 1030 of logistics hub 1000 can be co-located with consolidation center 1010 of logistics hub 1000, items can be transported to customers in the neighborhood in container devices via one or more underground tunnels or to customers outside of the neighborhood via a delivery truck that picks up the item at consolidation center 1010 of logistics hub 1000. It should be noted that this can allow consumers to shop throughout the neighborhood without having to carry purchases with the consumer, which may free the consumer from using a car to transport purchased items from the retail store to the residence.

In some embodiments, logistics hub 1000 can include a borrowing library 1040 of items (such as power tools or sound systems) that is available for delivery across the neighborhood. For example, borrowing library 1040 can contain a peer-to-peer "library of things" service for residents and/or businesses of the neighborhood that allows on to borrow or rent particular items. In continuing this example, the borrowing library 1040 of logistics hub 1000 can store these various items and allow users to rent them out. In a more particular example, a client application that corresponds to borrowing library 1040 of logistics hub 1000 can be used by a user to rent and/or borrow a particular item that is available in borrowing library 1040 for delivery to the residence associates with the user, where the client application can provide one or more user interfaces that present the individual items that are available for rent.

Accordingly, logistics hub 100 can be provided for, among other things, deliveries, waste, storage, and/or borrowing services. Such a logistics hub 1000 can, for example, centralize inbound and outbound deliveries with the use of container devices, such as the container devices described below in connection with FIGS. 1B-1D.

Figure 1B:
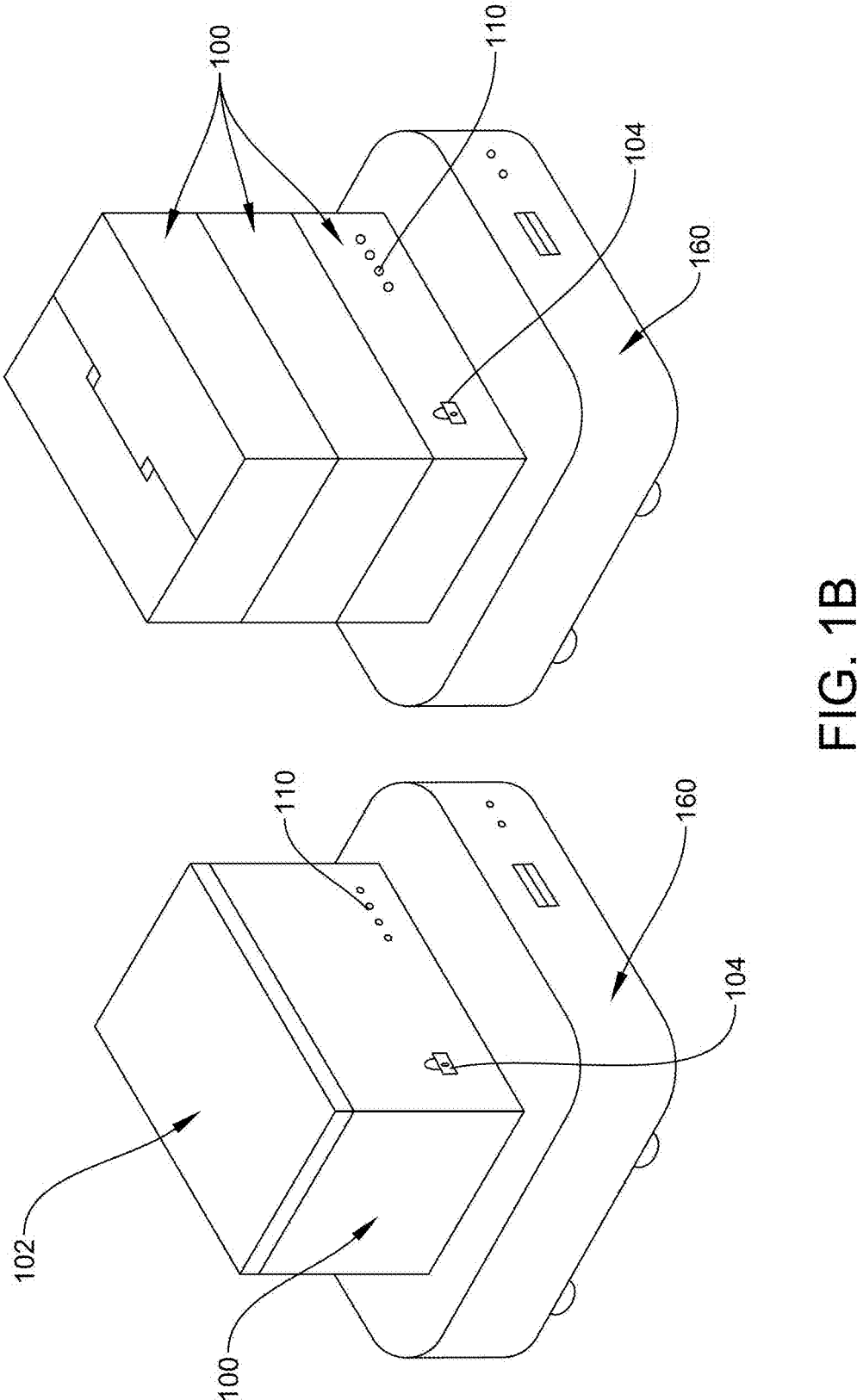
FIGS. 1B-1D show illustrative examples of container devices that can be used for shipping and deliveries in accordance with some embodiments of the disclosed subject matter.
Figure 1C:
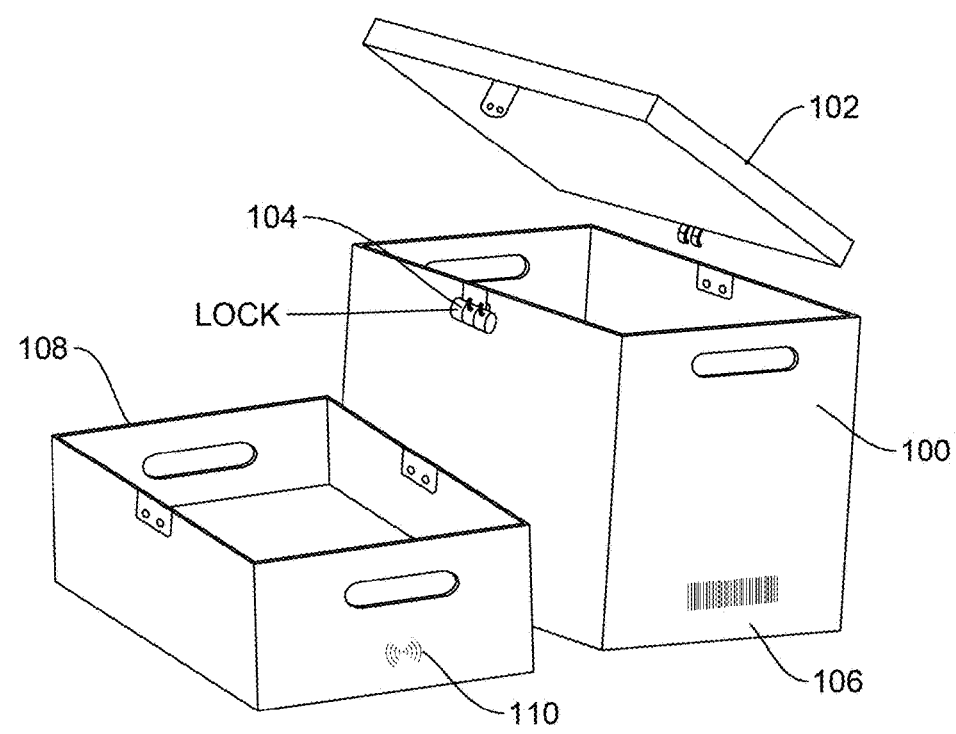
Figure 1D:
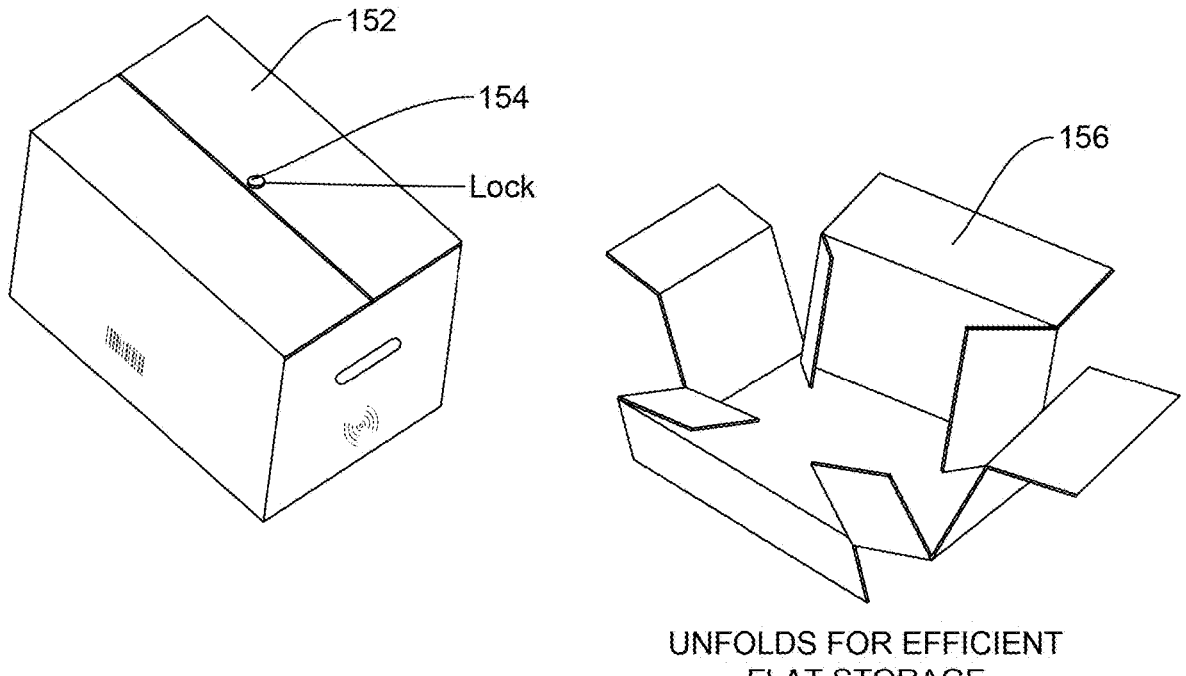

Turning to FIGS. 1B-1D, illustrative examples of a container device 100 are shown in accordance with some embodiments of the disclosed subject matter.

Container device 100 can be any suitable type of container device for holding any suitable number (e.g., one, two, five, ten, and/or any other suitable number) of packages. For example, in some embodiments, container device 100 can be a container device for holding a group of packages that are all to be delivered to a particular recipient. In some embodiments, container device 100 can be of any suitable shape. For example, in some embodiments, as illustrated in FIGS. 1B and 1C, in some embodiments, container device 100 can be a container device with rectangular sides. In some embodiments, container device 100 can be made of any suitable material or combination of materials (e.g., cardboard, metal, plastic, and/or any other suitable material(s)).

Note that, in some embodiments, container device 100 can be of any suitable size. For example, as illustrated in FIGS. 1B and 1C, container device 100 can be of a relatively large size. Additionally or alternatively, in some embodiments, as shown in FIG. 1C, a container device can be of a relatively smaller size, such as container device 108 (in which the height of container device 108 is less than the height of container device 100). Note that, in some embodiments, a logistics hub can use multiple container devices of varying sizes. In some such embodiments, container devices of varying sizes (e.g., container device 100 and container device 108) can be sized such that a lid (e.g., lid 102) fits on multiple container devices of different sizes. For example, as illustrated in FIG. 1C, container device 100 and container device 108 can be sized to have the same dimensions in two dimensions (e.g., length and width), but differently sized in a third dimension (e.g., height), such that lid 102 fits on both container device 100 and container device 108.

Additionally, note that, in some embodiments, container device 100 can be configured or sized in any suitable manner to hold any suitable number of storage totes, which can be used to store items at a logistics hub. For example, in some embodiments, packages or items can be stored in any suitable type of storage tote, which can be identified in any suitable manner. For example, each storage tote can be associated with a unique identifier that indicates a resident or entity who is storing items in the storage tote. As another example, in some embodiments, each storage tote can be used to hold packages to be delivered to a particular recipient. In some such embodiments, the storage tote can then be moved in to container device 100, for example, in response to an indicating that items or packages in the storage tote are to be delivered to the recipient.

As illustrated in FIGS. 1B and 1C, in some embodiments, container device 100 can have a lid 102. In some embodiments, lid 102 can be configured to attach to container device 100 in any suitable manner. For example, in some embodiments, lid 102 can attach to container device 100 with one or more latches that secure lid 102 to container device 100. Additionally, as shown in FIG. 1C, container device 100 and/or lid 102 can be connected to a lock 104. In some embodiments, lock 104 can prevent container device 100 from being opened by a person other than an intended recipient of container device 100. In some embodiments, lock 104 can be any suitable type of lock, such as a digital lock that uses any suitable type of verification to authenticate a recipient. For example, in some embodiments, lock 104 can use a fingerprint reader, facial recognition, a keypad that accepts a PIN or other passcode, and/or any other suitable type of digital lock.

In some embodiments, container device 100 can be configured with one or more sensors such that, in response to the sensors detecting that secure lid 102 has been connected to container device 100, container device 100 can actuate the locking mechanism of lock 104 to secure the contents of container device 100 and can transmit the PIN or passcode for unlocking container device along with the unique identifier associated with container device 100, the identifier associated with the contents of container device 100, and the identifier associated with the recipient of container device 100 for storage in a secure database. It should be noted that lock 104 can be unlocked using any suitable approach. For example, rather than accepting a PIN or a passcode, lock 104 can be unlocked by receiving a particular communications signal (e.g. a near field communication signal, a Bluetooth signal, etc.) from a device associated with the recipient in which the recipient has been authenticated using his or her unique identifier. In continuing this example, in response to receiving the communications signal from the device, lock 104 can actuate to become unlocked such that secure lid 102 can be removed from container device 100 and the sensors, upon detecting that secure lid 102 has been removed or that container device 100 has otherwise been opened, can transmit a confirmation signal to the server that causes an indication that container device 100 has been received and opened to be stored in a corresponding database entry of the secure database.

As illustrated in FIG. 1C, in some embodiments, container device 100 can have a barcode 106. In some embodiments, barcode 106 can correspond to a unique identifier of container device 100. In some embodiments, barcode 106 can be used for any suitable purpose. For example, as described below in more detail in connection with FIG. 2, a unique identifier of container device 100 that corresponds to barcode 106 can be associated with a package inside container device 100 as well as an identifier of a recipient of container device 100. In some such embodiments, barcode 106 can then be scanned at any suitable time points (e.g., as a package is placed in container device 100, as container device 100 is moved along a delivery pipeline, at a time point that container device 100 is delivered to a recipient, and/or at any other suitable time points) such that a recipient of container device 100 can track container device 100, and therefore, a package inside container device 100. Additionally or alternatively, in some embodiments, container device 100 can have an embedded RFID tracker 110 that can be used to track a container device and/or a package inside a container device.

Turning to FIG. 1D, another example of a container device 152 that can be used for storing and/or delivering items is shown in accordance with some embodiments of the disclosed subject matter. As illustrated, container device 152 can have a lock 154. In some embodiments, lock 154 can be any suitable lock, such as a digital lock similar to lock 104, as described above in connection with FIG. 1C.

Note that, as shown in FIG. 1D, in some embodiments, container device 152 can be made of any suitable material (e.g., cardboard, fabric, and/or any other suitable type of material) such that container device 152 can be unfolded and/or deconstructed in any suitable manner, as shown by unfolded container device 156 in FIG. 1D.

It should also be noted that, in some embodiments, container devices can be stacked to form a delivery locker system as shown in FIG. 1B. For example, container devices can be configured with alignment mechanisms that allow a first container device to be aligned with a second container device. For example, rather than including lid 102 shown in FIGS. 1C and 1D, a first container device 100 can be configured to be stackable such that the container device can be opened from a side portion while being in a stacked orientation with a second container device 100 (as opposed to the 102 in which lid is connected to container device 100 using a latching mechanism and a lock 104). In another example, a first container device 100 can be configured to be stackable such that lock 104 can be accessible and bar code 106 can remain visible while being in a stacked orientation with a second container device 100.

For example, in response to a robotic dolly 160 or other autonomous delivery vehicle determining that the recipient is unavailable (e.g., unsuccessful attempts to reach the recipient, inability to reach a location associated with the recipient, receiving a notification from the recipient that the recipient is not available to receive a container device containing one or more packages, etc.), the robotic dolly 160 can place the associated container device in a location designated for the temporary storage of container devices (e.g., a mail room, a delivery locker room, a front porch, a yard, and/or any other suitable location). In continuing this example, in response to detecting that another container device has been placed in the designated container device location, the robotic dolly can be configured to stack the container device on the container device that has been placed in the designated container device location as shown in FIG. 1B (e.g., by aligning the container devices using the alignment mechanisms on the container devices). This delivery locker system can, for example, act as a mailroom, thereby providing a space where tenants of one or more buildings can easily access mail and packages.

Additionally or alternatively to the locker system, the alignment and connection mechanisms that are integrated in each container device can allow a container device to be stacked onto another container device to create a stacked assembly for loading onto and transport using a robotic dolly. For example, in response to determining that two container devices are being delivered to similar locations (e.g., where the two container devices are being delivered to the same building or the same recipient, where it is determined that the two container devices have a similar delivery path via underground tunnels, etc.), the robotic dolly can be configured to stack a first container device onto a second container device to form a stacked assembly that is then loaded onto the robotic dolly for delivery.

It should be noted that, although the container devices are generally described as being handled by a robotic dolly, any suitable type of delivery vehicle can be used to transport a container device. For example, a container device can be configured to be transported by a cargo bicycle, a self-driving vehicle, or a delivery drone.

Turning to FIG. 2, an illustrative example 200 of a process for managing shipping and deliveries is shown in accordance with some embodiments of the disclosed subject matter. Note that, in some embodiments, process 200 can be implemented on any suitable device. For example, in some embodiments, blocks of process 200 can be implemented on a server associated with a logistics hub, such as a hub where packages and other deliveries for a particular geographic region (e.g., a town, a city, etc.) are first received prior to being delivered to their final recipients.

Process 200 can begin at 202 by receiving a package to be delivered to a recipient. Note that, in some embodiments, a package as referred to herein can refer to any suitable type of package, mail, and/or parcel that is being delivered using any suitable delivery service.

In some embodiments, process 200 can receive the package in any suitable manner. For example, in some embodiments, the logistics hub can receive a group of packages delivered to a loading bay of the logistics hub (e.g., logistics hub 1000 of FIG. 1A) from a truck associated with a particular shipping or mail service. As a more particular example, in some embodiments, the logistics hub can have one or more extendable conveyor belts such that a conveyor belt can be moved into a back portion of a delivery truck trailer. Packages, pallets, or other items from the delivery truck trailer can then be placed onto the conveyor belt to be moved into the logistics hub. Note that, in some embodiments, packages, pallets, or other items from the delivery truck can be placed onto the conveyer belt in any suitable manner. For example, in some embodiments, a robotic arm or other autonomous truck unloading system can be used to move packages or pallets from the delivery truck onto the conveyer belt. In some embodiments, the conveyor belt can have any suitable orientation. For example, in some embodiments, the conveyor belt can be oriented at a decline such that packages or other items placed on the conveyor belt are transported to a basement or below ground area of the hub. In some embodiments, packages, pallets, or other items can be removed from the conveyor belt at the logistics hub in any suitable manner. For example, in some embodiments, items can be removed from the conveyor belt using a robotic arm or other automated apparatus.

Note that, in some embodiments, packages or items can be routed within the logistics hub in any suitable manner. For example, in some embodiments, packages or items can be routed to particular areas within the logistics hub based on a delivery address associated with each package or item. As a more particular example, in some embodiments process 200 can determine a delivery address associated with a particular item, and can determine a particular area within the logistics hub to which the item is to be routed based on the delivery address of the item, such that packages or items that are to be delivered within a particular proximity of each other (e.g., within the same city block, to the same apartment building, and/or within any other suitable proximity), are routed to the same area within the logistics hub. In some embodiments, a delivery address associated with a package or other item can be determined in any other suitable manner. For example, in some embodiments, process 200 can scan an address printed on the package or on a delivery slip associated with an item to be delivered. In some embodiments, process 200 can identify any other suitable information associated with a package or item to be delivered, such as a weight of the package or item, dimensions of the package or item, a relative urgency of contents of the package or item, and/or any other suitable information.

As another example, in some embodiments, packages or items can be routed within the logistics hub based on a need for the packages or items to be refrigerated. As a more particular example, in some embodiments, a package or item that requires refrigeration (e.g., e.g., a package that contains food, a package that contains particular types of medication, etc.) can be routed to a particular area of the logistics hub and stored within a particular temperature range until the package is ready to be delivered to the recipient. In some embodiments, process 200 can determine whether a package or item requires refrigeration based on any suitable information, such as information printed on the outside of the package and/or information printed on a delivery slip associated with a package or item to be delivered.

Additionally, note that, in some embodiments, arrival of delivery vehicles to the logistics hub to deliver packages or items to the logistics hub can be staggered or scheduled in any suitable manner. For example, in some embodiments, delivery vehicles can be scheduled to arrive at the logistics hub such that delivery vehicles arrive at the logistics hub over any suitable time period (e.g., over six hours, over twelve hours, over 24 hours, and/or any other suitable time period), thereby alleviating congestion of delivery vehicles at the logistics hub during a limited time period. As another example, in some embodiments, delivery vehicles can be scheduled such that an arrival of different delivery vehicles to the logistics hub is spread out over any suitable time period (e.g., over six hours, over twelve hours, over 24 hours, and/or any other suitable period).

At 204, process 200 can cause the package to be placed in a container device that is to be delivered to the recipient of the package. Note that, in some embodiments, process 200 can cause the package to be placed in any suitable container or type of container device. For example, in some embodiments, the container device can be a container that includes a barcode or RFID tag that allows the container device to be tracked, as described above in connection with FIG. 1A. As another example, in some embodiments, the container device can be a container that includes a digital lock that can only be unlocked by a particular user or users (e.g., the recipient of the package, a user granted access to the container device by the recipient of the package, and/or any other suitable user).

In some embodiments, process 200 can cause the package to be placed in the container device in any suitable manner. For example, in some embodiments, process 200 can actuate a robotic arm that causes the package to be placed in the container device. As a more particular example, in some embodiments, process 200 can actuate a robotic arm that causes the package to be lifted from a conveyer belt that holds multiple packages and/or any other suitable surfaces and causes the package to be placed in a particular container device.

Note that, in some embodiments, process 200 can identify a particular container device in which the package is to be placed. For example, in some embodiments, process 200 can identify the particular container device based on a size of the package. As a more particular example, in some embodiments, process 200 can identify a size of a container device from a group of potential container devices such that the selected container device is the smallest container device that is large enough to hold the package. Note that in some such embodiments, process 200 can actuate a robotic arm or any other suitable mechanism that causes an identified or selected container device to be placed in a location suitable for placing the package in the container device prior to causing the package to be placed in the container device.

At 206, process 200 can associate the package, the container device, and the recipient. In some embodiments, process 200 can associate the package, the container device, and the recipient using identifiers for each of the package, the container device, and the recipient. For example, in some embodiments, process 200 can identify a tracking identifier associated with the package and can associate the tracking identifier of the package with a unique identifier associated with the container device that the package is placed in and with an identifier of the recipient. In some embodiments, process 200 can identify the tracking identifier associated with the package in any suitable manner and based on any suitable information, such as based on information provided by a sender of the package (e.g., a person or business who shipped the package, and/or any other suitable sender), information provided by a shipping or mail service associated with shipment of the package to the logistics hub, and/or based on any other suitable information. In some embodiments, process 200 can identify the identifier associated with the container device based on any suitable information. For example, in some embodiments, process 200 can determine the identifier associated with the container device by scanning a barcode printed on the container device (e.g., as shown in and described above in connection with FIG. 1A) and/or by scanning an RFID chip associated with the container device (e.g., as shown in and described above in connection with FIG. 1A). In some embodiments, process 200 can determine an identifier associated with the recipient in any suitable manner. For example, in some embodiments, process 200 can match a recipient name printed on the package with a name of a user who has signed up with the delivery service for delivery of packages to identify a username of the user in connection with the delivery service.

At 208, process 200 can update a database or delivery log with information indicating the association of the package, container device, and recipient. For example, in some embodiments, process 200 can create an entry for a delivery log or other database entry that associates the tracking identifier of the package, the identifier of the container device that the package is placed in, and an identifier of the recipient. In some embodiments, the entry can include any other suitable information, such as a date and/or a time the package was received at the logistics hub, a name or other identifier of a sender of the package, a weight of the package, a size of the package, and/or any other suitable information.

At 210, process 200 can determine whether the container device is ready to be delivered to the recipient. In some embodiments, process 200 can determine whether the container device is ready to be delivered to the recipient based on any suitable information. For example, in some embodiments, process 200 can determine whether the container device is ready to be delivered to the recipient based on the contents of the package in the container device. As a more particular example, in an instance in which the contents of the package are perishable, process 200 can determine that the container device is to be delivered immediately, and that the container device is therefore ready to be delivered to the recipient. As another more particular example, in an instance in which delivery of the package is determined to be urgent, process 200 can determine that the container device is ready to be delivered to the recipient. In some embodiments, process 200 can determine the contents of the package and/or an urgency of delivery of the package based on any suitable information. For example, in some embodiments, process 200 can determine the contents of the package and/or an urgency of delivery of the package based on information provided by the delivery service associated with delivery of the package to the logistics hub and/or based on information provided by a sender of the package.

As another example, in some embodiments, process 200 can determine whether the container device is ready to be delivered to the recipient based on a number of packages expected for the recipient within a predetermined duration of time (e.g., a number of packages expected to arrive on the current day, a number of packages expected within the next two days, and/or any other suitable duration of time). As a more particular example, in an instance in which process 200 determines that the package received at block 202 is the first package out of a group of packages expected for the recipient to arrive at the logistics hub on the same day, process 200 can determine that the container device is to wait at the logistics hub until a predetermined number of packages in the group of packages (e.g., all of the packages, and/or any other suitable number of packages) are placed in the container device. Continuing with this example, process 200 can therefore determine that the container device is not ready for delivery to the recipient. As another more particular example, in an instance in which process 200 determines that the package received at block 202 is the final package in a group of packages for the recipient that are expected to arrive at the logistics hub on the same day and/or is the only expected package for the recipient, process 200 can determine that the container device is ready for delivery to the recipient.

In some embodiments, process 200 can receive the information indicating a number of expected packages for the recipient from any suitable source. For example, in some embodiments, process 200 can receive information from one or more shipping services of packages being delivered to the logistics hub for different recipients. As another example, in some embodiments, a central database associated with process 200 and/or the logistics hub can receive information relating to deliveries to the logistics hub from different shipping service that deliver packages to the logistics hub. In some such embodiments, process 200 can aggregate the received information from multiple shipping services to identify a number of packages arriving at the logistics hub for a particular recipient on a particular day. As a more particular example, in an instance in which process 200 receives information from a first shipping service that two packages are arriving at the logistics hub for Person A via the first shipping service on the current day and where process 200 receives information from a second shipping service that one package is arriving at the logistics hub for Person A via the second shipping service on the current day, process 200 can determine that three total packages are expected to arrive for Person A on the current day. Process 200 can determine that the container device is not ready for delivery to Person A until all three packages have been placed in the container device. Note that, in some embodiments, process 200 can determine that the container device is ready for delivery to the recipient in instances in which fewer than a number of expected packages have been placed in the container device. For example, in an instance in which one package of a group of expected packages has been placed in the container device and it is determined that the one package contains perishable and/or urgent content, process 200 can determine that the container device is to be delivered to the recipient before the other expected packages have arrived at the logistics hub. As another example, in an instance in which a particular expected package has not arrived at the logistics hub within an expected time frame, process 200 can determine that the expected package is delayed and can determine that the container device is ready for delivery to the recipient before the delayed package arrives at the logistics hub.

Note that, in some embodiments, process 200 can determine that an expected package for a recipient has arrived at the logistics hub via a particular shipping service in any suitable manner. For example, in some embodiments, a barcode (e.g., printed on a package, and/or any other suitable barcode) that unique identifies the package and is associated with the particular shipping service can be scanned when the package arrives at the logistics hub. In some embodiments, process 200 can then query a central database using the scanned barcode to determine a number of expected packages for the recipient that are expected that day and/or to determine any other suitable delivery information.

If, at 210, process 200 determines that the container device is not ready for delivery to the recipient ("no" at 210), process 200 can loop back to 202 and receive another package at the logistics hub to be delivered to the recipient. Note that, in some embodiments, as described above, process 200 can loop through blocks 202-210 until all expected packages for a particular recipient have been placed in the container device.

If, at 210, process 200 determines that the container device is ready for delivery to the recipient ("yes" at 210), process 200 can proceed to 212 and can cause the container device to be loaded onto a delivery vehicle for delivery to the recipient. In some embodiments, process 200 can cause the container device to be loaded onto the delivery vehicle in any suitable manner. For example, in some embodiments, process 200 can actuate a robotic arm and/or any other suitable mechanisms that lifts the container device and loads it in or on the delivery vehicle.

Figure 3A:
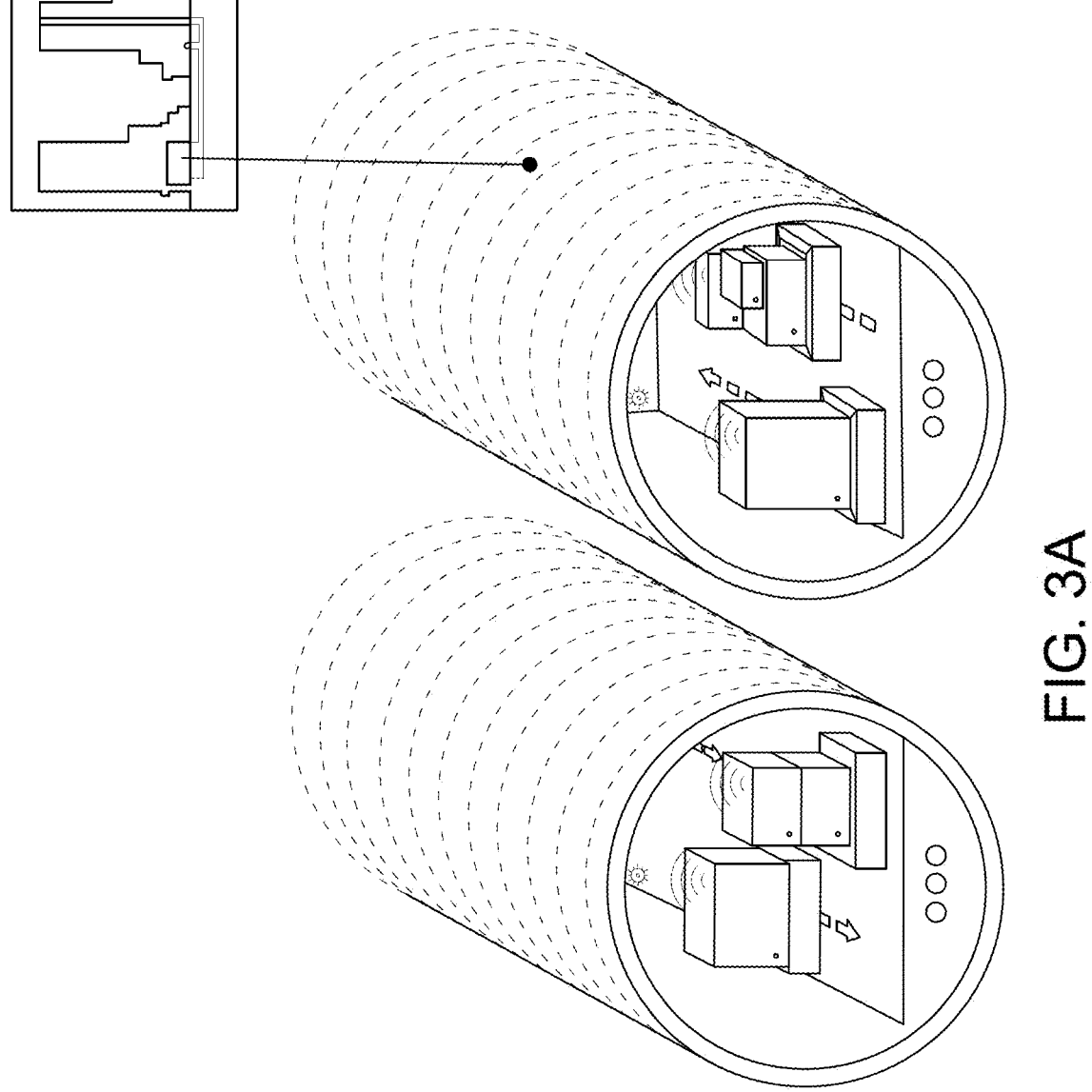
FIG. 3A shows an illustrative example of an underground tunnel system that may be used by one or more delivery vehicles, such as a robotic dolly, and that can connect a logistics hub with one or more buildings in accordance with some embodiments of the disclosed subject matter.

Note that, in some embodiments, the delivery vehicle can be any suitable type of delivery vehicle. For example, as shown in FIGS. 1B and 3A, the delivery vehicle can be a self-driving delivery dollar that the container device is placed upon and that delivers the package in the container device to the recipient at a final destination via one or more underground tunnels between the logistics hub and a residential building. It should be noted that the delivery vehicle can be a car, a truck, a van, a bicycle, a dolly, a cart, and/or any other suitable vehicle. Additionally, in some embodiments, the delivery vehicle can be operated in any suitable manner. For example, in some embodiments, the delivery vehicle can be driven or otherwise moved manually (e.g., by a human driver or operator). As another example, as shown in FIGS. 1B and 3A, the delivery vehicle can be operated autonomously or semi-autonomously. Note that, in instances in which the delivery vehicle is operated autonomously or semi-autonomously, the delivery vehicle can receive any suitable instructions from any suitable source. For example, in some embodiments, the delivery vehicle can receive instructions indicating that the delivery vehicle has been fully loaded from process 200.

Figure 3B:
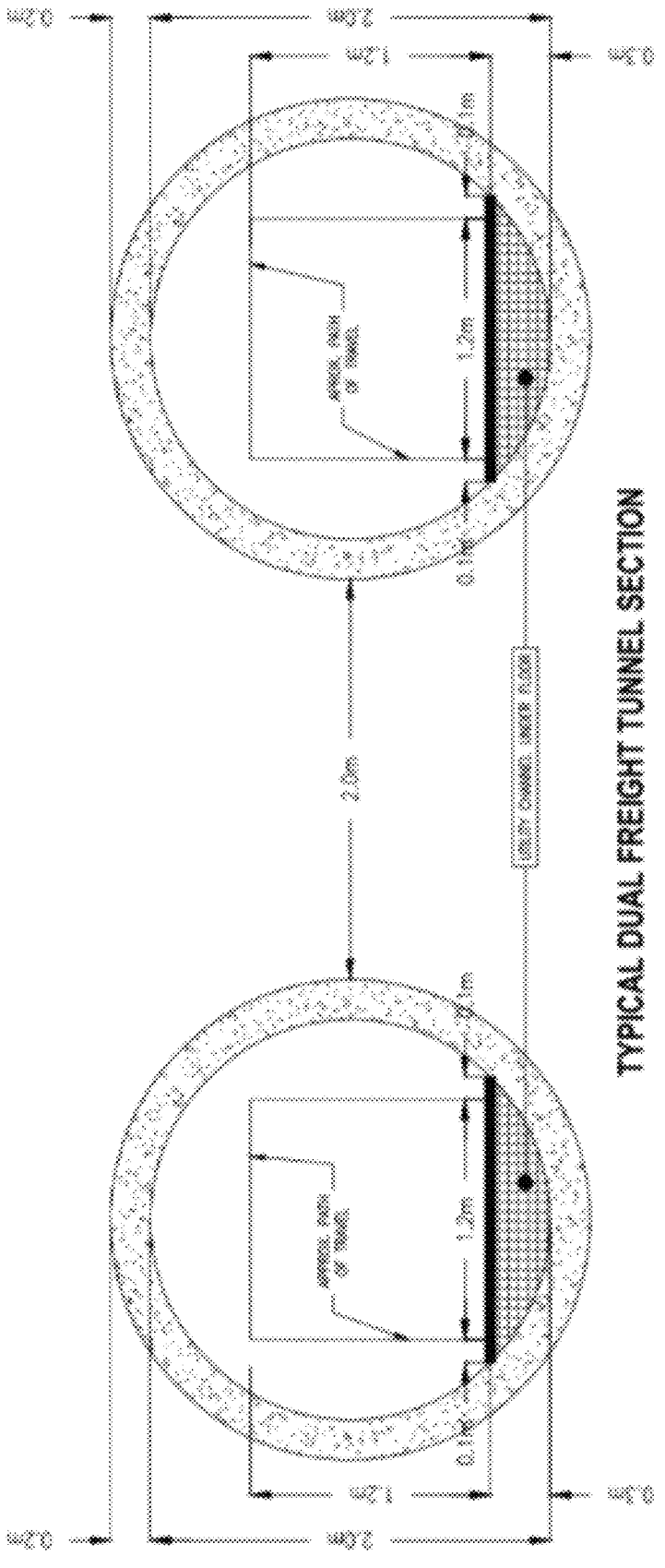
FIG. 3B shows an illustrative schematic of an underground tunnel that may be used by one or more delivery vehicles, such as a robotic dolly, and that can connect a logistics hub with one or more buildings in accordance with some embodiments of the disclosed subject matter.

Additionally, note that, in some embodiments, the delivery vehicle can deliver container devices in any suitable manner. For example, as shown in FIGS. 1A and 3A, delivery vehicles can move to buildings to which container devices are to be delivered via underground tunnels. As a more particular example, in some embodiments, underground delivery tunnels can be constructed between basements of buildings, such that delivery vehicles travel between buildings via the underground delivery tunnels and within basements of buildings. In some embodiments, a delivery tunnel can have any suitable dimensions to accommodate a delivery vehicle. For example, in instances in which a delivery vehicle is a robotic dolly or other autonomous vehicle, the delivery tunnel can be large enough to accommodate the robotic dolly or autonomous delivery vehicle as well as a person for maintenance. In another example, the delivery tunnel can be bi-directional freight tunnels that can connect directly to buildings, thereby allowing robotic dollies or autonomous delivery vehicles to delivery packages, carry storage items back and forth, and collect waste. A more particular example of a delivery tunnels are shown in FIGS. 3A and 3B.

Additionally, note that, in some embodiments, process 200 can cause any suitable functions to be performed prior to causing the container device to be loaded on the delivery vehicle. For example, in some embodiments, process 200 can cause the container device to be locked using any suitable lock on the container device, such as a digital lock associated with the container device, as shown in and described above in connection with FIGS. 1B and IC. In some embodiments, in an instance in which the lock is a digital lock, process 200 can cause the lock to be programmed with any suitable authentication code associated with the recipient that can be used by the recipient to unlock the container device using the digital code. For example, in some embodiments, process 200 can cause the lock to be programmed using a PIN or other passcode set by the recipient. As another example, in some embodiments, process 200 can associate fingerprint data or other biometric data corresponding to the recipient with the lock. Note that, in an instance in which process 200 associates a PIN or passcode from the recipient or biometric data corresponding to the recipient with the lock, process 200 can receive the information from the recipient in any suitable manner. For example, in some embodiments, process 200 can receive the information from the recipient via an application (e.g., an application executing on a user device of the recipient) associated with the locker hub or a delivery service provided by the logistics hub.

At 214, process 200 can update the database entry created at 208 with information indicating a location of the container device. For example, in some embodiments, process 200 can update the database entry indicating that the container device has been loaded onto the vehicle. As another example, in some embodiments, process 200 can update the database entry indicating a current location of the vehicle. Note that, in some embodiments, in instances in which process 200 updates the database entry with a location of the delivery vehicle, process 200 can receive the location in any suitable manner. For example, in some embodiments, process 200 can receive a message or other transmission from the delivery vehicle that indicates a current location (e.g., current GPS coordinates, a current tunnel within a series of underground tunnels traveled by the delivery vehicle, and/or any other suitable location information) of the delivery vehicle. Additionally, note that, in some embodiments, process 200 can update the database entry any suitable number of times. For example, in an instance in which process 200 receives multiple messages or transmissions from the delivery vehicle indicating updated locations of the delivery vehicle, process 200 can update the database entry in response to receiving each message or transmission.

At 216, process 200 can, in response to receiving a request from a user device associated with the recipient, present information indicating a current location of the container device. In some embodiments, process 200 can present the information in any suitable manner. For example, in some embodiments, process 200 can receive the request via an application executing on the user device (e.g., an application associated with the logistics hub and/or a delivery service associated with the logistics hub, and/or any other suitable application), and process 200 can cause the information associated with the current location of the container device to be indicated via a user interface presented through the application. In some embodiments, process 200 can present the information indicating the current location of the container device in any suitable format. For example, in some embodiments, process 200 can cause a map to be presented where a current location of the container device is highlighted (e.g., marked with a particular icon, and/or highlighted in any other suitable manner). In some embodiments, process 200 can cause the map to be updated with an updated location of the container device in real-time or in near real-time, for example, as the delivery vehicle on which the container device is loaded moves. As another example, in some embodiments, process 200 can cause text that indicates a current location of the container device to be presented on the user device. As a more particular example, process 200 can cause a list of locations that the container device has been to be presented, where the list is continually updated as process 200 receives updated location information (e.g., as described above in connection with block 214).

Note that, in some embodiments, process 200 can cause information indicating a current location of the container device to be presented on the user device associated with the recipient without receiving a request from the user device. For example, in some embodiments, in response to determining that the current location is within a predetermined proximity to a final destination of the container device (e.g., within one hundred feet, within one thousand feet, and/or any other suitable proximity, within one minute of arriving at the final destination, and/or any other suitable proximity), process 200 can cause a notification (e.g., a push notification, a text message, an e-mail, and/or any other suitable notification) to be transmitted to the user device and/or presented on the user device. As a more particular example, in some embodiments, the notification can indicate to the recipient that the container device will be arriving within a particular time frame (e.g., within one minute, within five minutes, and/or any other suitable time frame).

At 218, process 200 can receive information indicating that the container device has been delivered to the recipient.

In some embodiments, process 200 can receive the information in any suitable manner. For example, in some embodiments, process 200 can receive the information from the delivery vehicle and/or from an operator of the delivery vehicle. As a more particular example, in some embodiments, process 200 can receive a message or other transmission from the delivery vehicle and/or from a user device associated with the operator of the delivery vehicle that indicates any suitable information associated with delivery of the container device, such as whether a recipient of the container device signed for the package, a date and/or a time the container device was delivered, a particular location the container device was left if the recipient did not sign for the container device (e.g., on a front porch, in a backyard, a designated locker area, etc.), and/or any other suitable information. Note that, in instances in which the container device is delivered without the recipient signing for delivery of the container device, the recipient may be required to sign any suitable waiver or agreement that allows delivery of the container device. In some embodiments, the waiver or agreement can indicate any suitable information, such as that particular types of deliveries (e.g., non-perishables, packages worth less than a predetermined amount, and/or any other suitable type of deliveries) may be left for the recipient without signature (e.g., on a front porch, in a mail room, etc.), that particular users are allowed to sign on behalf of the recipient (e.g., a doorman of an apartment building, a neighbor, and/or any other suitable user), and/or any other suitable delivery information. In some embodiments, process 200 can maintain a chain of custody of a package or item via a central database that is accessed by process 200. For example, in some embodiments, process 200 can update the central database at different timepoints associated with delivery of the package or item, such as at a timepoint the package leaves the logistics hub, at a timepoint the package is signed for by a user designated by the recipient, at a timepoint the package is left unattended in a particular location (e.g., in a mail room, on a front porch, etc.), and/or at any other suitable timepoints.

At 220, process 200 can update the database entry with an indication that the container device has been delivered to the recipient. For example, in some embodiments, process 200 can update the database entry with any suitable information received at block 218, as described above. As a more particular example, in some embodiments, process 200 can update the database entry to indicate whether the container device was signed for by the recipient, a location the container device was left if the recipient did not sign for the container device, a date and/or a time the container device was delivered, and/or any other suitable information.

Note that, in some embodiments, the delivery vehicle used to deliver the container device can pick up any suitable items from the recipient at a time of delivery of the container device. For example, in some embodiments, the delivery vehicle can pick up one or more container devices that were previously used to deliver packages and can return the one or more container devices to the logistics hub for re-use. In some embodiments, process 200 can instruct the delivery vehicle to pick up any suitable items for transport to the logistics hub. For example, in some embodiments, process 200 can instruct the delivery vehicle to load a particular number of empty container devices from the recipient and transport the empty container devices to the logistics hub. In some such embodiments, process 200 can receive information indicating a type of items and a number of items that are to be transported to the logistics hub by the delivery vehicle from any suitable source. For example, in some embodiments, process 200 can receive the information from the recipient via an application (e.g., an application associated with the logistics hub or a delivery service associated with the logistics hub, and/or any other suitable application) executing on a user device associated with the recipient.

Note that, although the techniques described above in connection with FIGS. 1A-2 are described as techniques for delivery of packages or other items, in some embodiments, the techniques described above can be used for any other suitable functions. For example, in some embodiments, the container devices described above in connection with FIGS. 1A-1D and the functions described above in connection with FIG. 2 associated with the logistics hub can be used for storage of items by residents of a geographical region associated with the logistics hub. As a more particular example, in some embodiments, the logistics hub can be used as a centralized storage facility. In some such embodiments, items can be stored within container devices (e.g., as shown in and described above in connection with FIGS. 1A-1D). Additionally or alternatively, in some embodiments, items can be stored in any suitable type of storage tote at the logistics hub. In some embodiments, a user who has stored items in a container device can request that the container device be delivered to them using the techniques described above in connection with FIG. 2. For example, in some embodiments, the user can identify a particular container device that is being stored at the logistics hub using an identifier of the container device via an application associated with the logistics hub. As a more particular example, in some embodiments, an identified container device can then be loaded onto a delivery vehicle as described above in connection with block 212 of FIG. 2, and information associated with a location of the container device while it is on the delivery vehicle can be stored and provided to the user, as described above in connection with blocks 214-218 of FIG. 2. In some embodiments, the user can then receive a notification when the requested container device is delivered, as described above in connection with block 220 of FIG. 2. As another example, in instances in which items are stored in a storage tote, the storage tote can be loaded into a container device, which can then be delivered to a user, as described above.

Additionally, note that, in some embodiments, the delivery system described above can be used to transport any suitable items from an end-user (e.g., a business, a resident of a building, etc.) to the logistics hub. For example, in some embodiments, the delivery system can be used to transport waste products (e.g., trash, recycling, etc.) from a business or residence to the hub, which can then sort and dispose of the waste products in any suitable manner. As another example, in some embodiments, the delivery system can be used to transport items to be stored at the hub from a residence to the hub, as described above.

Figure 4:
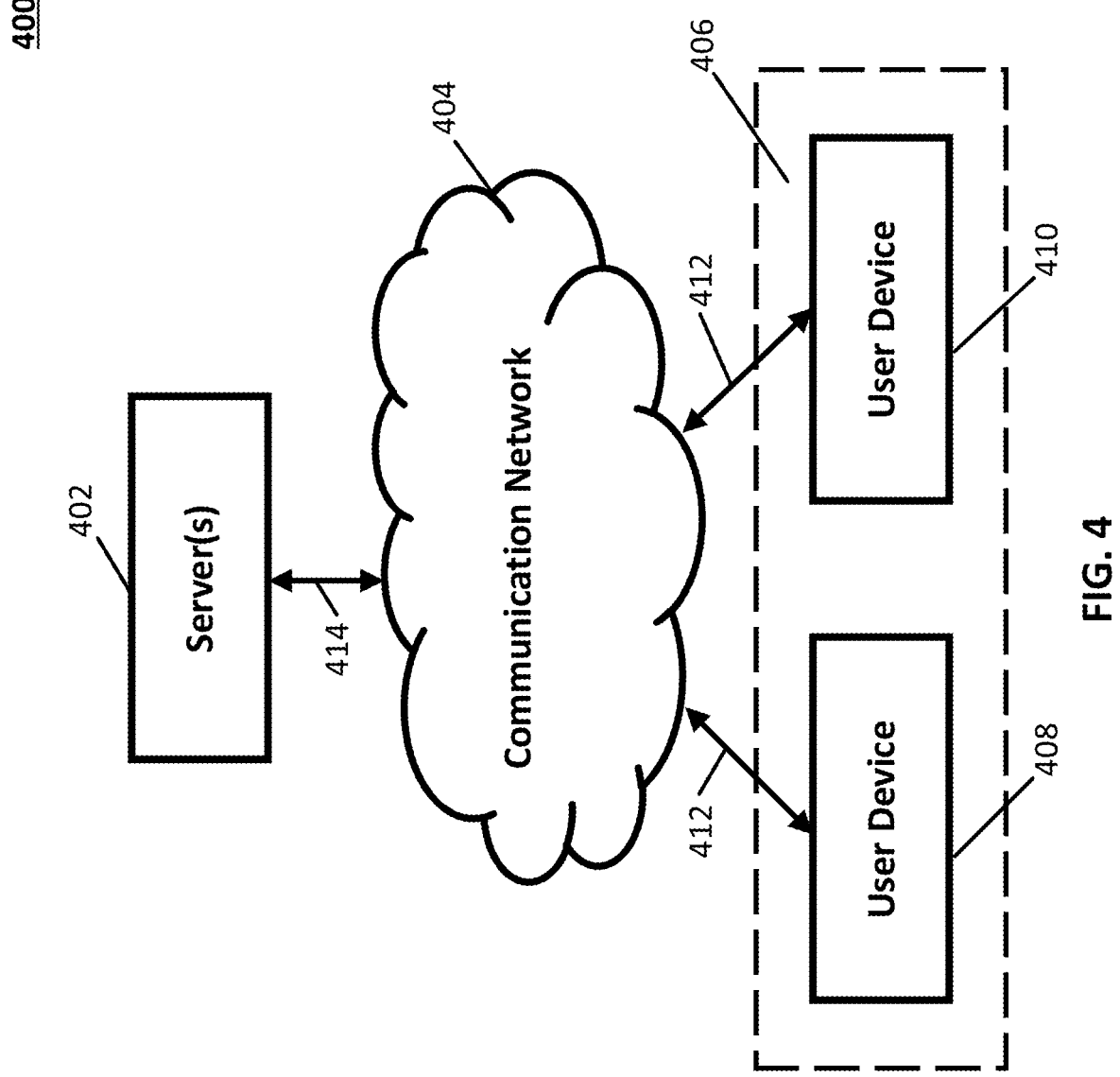
FIG. 4 shows a schematic diagram of an illustrative system suitable for implementation of mechanisms described herein for shipping and deliveries in accordance with some embodiments of the disclosed subject matter.
Figure 5:
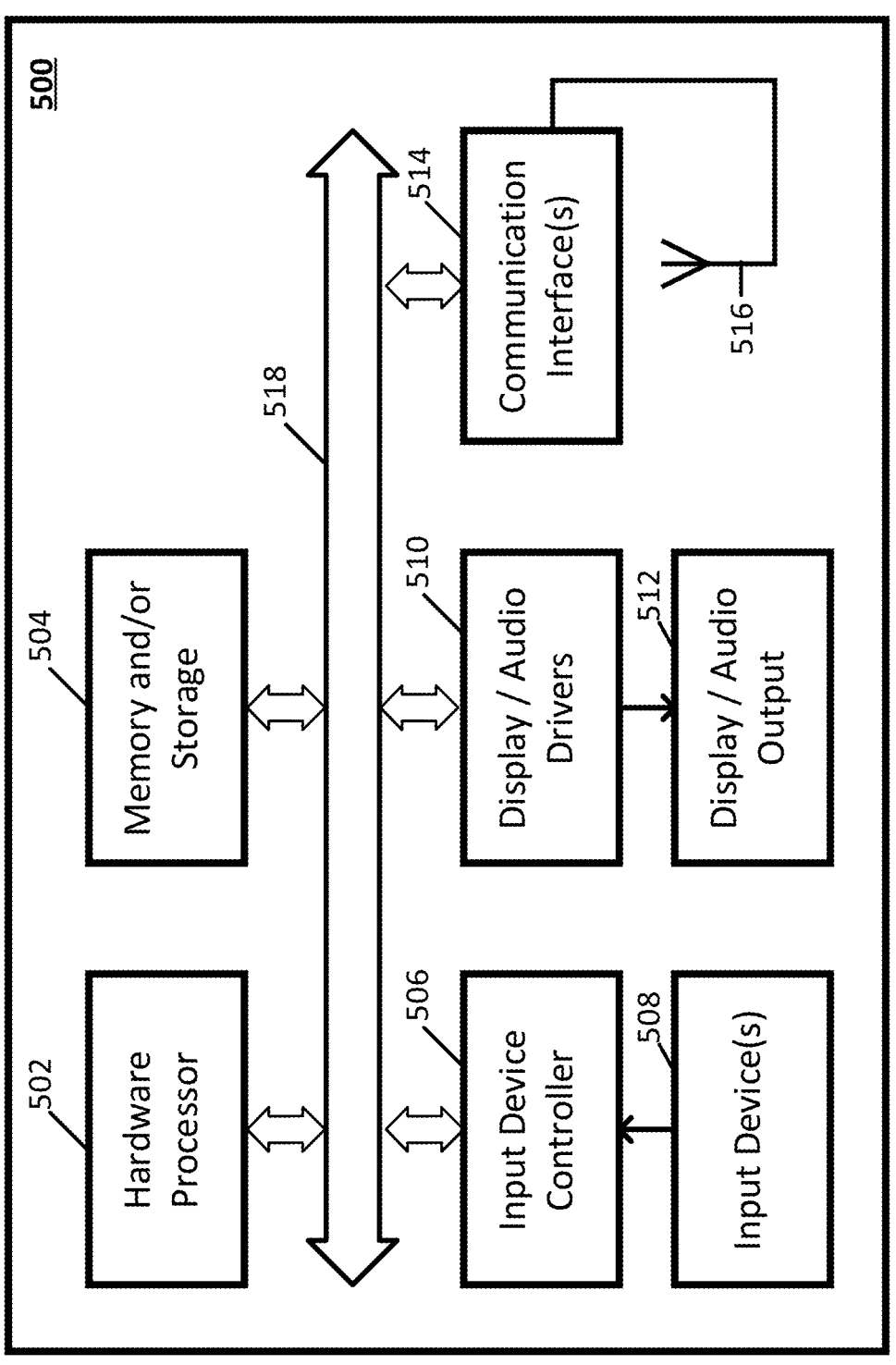
FIG. 5 shows a detailed example of hardware that can be used in a server and/or a user device of FIG. 4 in accordance with some embodiments of the disclosed subject matter.

Turning to FIG. 4, an example 400 of hardware for shipping and deliveries that can be used in accordance with some embodiments of the disclosed subject matter is shown. As illustrated, hardware 400 can include a server 402, a communication network 404, and/or one or more user devices 406, such as user devices 408 and 410.

Server 402 can be any suitable server(s) for managing shipping and deliveries. For example, in some embodiments, server 402 can be a server associated with a logistics hub. As a more particular example, in some embodiments, server 402 can be perform any of the functions shown in and described above in connection with FIG. 2, such as associating a received package with an identifier of a container device and a recipient, updating a database based on updated information about a container device, responding to requests from a user device associated with a recipient, and/or any other suitable function(s). Note that, in some embodiments, server 402 can be omitted.

Communication network 404 can be any suitable combination of one or more wired and/or wireless networks in some embodiments. For example, communication network 404 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 406 can be connected by one or more communications links (e.g., communications links 412) to communication network 404 that can be linked via one or more communications links (e.g., communications links 414) to server 402. The communications links can be any communications links suitable for communicating data among user devices 406 and server 402 such as network links, dial-up links, wireless links, hard-wired links, any other suitable communications links, or any suitable combination of such links.

User devices 406 can include any one or more user devices suitable for tracking a location of a container device or other shipment, accessing an application to be used for tracking a container device or other shipment, accessing an application to track or manage items stored in a central storage facility, and/or performing any other suitable function(s). For example, in some embodiments, user devices 406 can include a mobile phone, a tablet computer, a desktop computer, a wearable computer, a television, speakers, a media player, a desktop computer, a vehicle entertainment system, and/or any other suitable type of user device.

Although server 402 is illustrated as one device, the functions performed by server 402 can be performed using any suitable number of devices in some embodiments. For example, in some embodiments, multiple devices can be used to implement the functions performed by server 402.

Although two user devices 408 and 410 are shown in FIG. 4 to avoid over-complicating the figure, any suitable number of user devices, and/or any suitable types of user devices, can be used in some embodiments.

Server 402 and user devices 406 can be implemented using any suitable hardware in some embodiments. For example, in some embodiments, devices 402 and 406 can be implemented using any suitable general purpose computer or special purpose computer. For example, a mobile phone may be implemented using a special purpose computer. Any such general purpose computer or special purpose computer can include any suitable hardware. For example, as illustrated in example hardware 500 of FIG. 5, such hardware can include hardware processor 502, memory and/or storage 504, an input device controller 506, an input device 508, display/audio drivers 510, display and audio output circuitry 512, communication interface(s) 514, an antenna 516, and a bus 518.

Hardware processor 502 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 502 can be controlled by a server program stored in memory and/or storage of a server, such as server 402. In some embodiments, hardware processor 502 can be controlled by a computer program stored in memory and/or storage 504 of user device 406.

Memory and/or storage 504 can be any suitable memory and/or storage for storing programs, data, and/or any other suitable information in some embodiments. For example, memory and/or storage 504 can include random access memory, read-only memory, flash memory, hard disk storage, optical media, and/or any other suitable memory.

Input device controller 506 can be any suitable circuitry for controlling and receiving input from one or more input devices 508 in some embodiments. For example, input device controller 506 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 510 can be any suitable circuitry for controlling and driving output to one or more display/audio output devices 512 in some embodiments. For example, display/audio drivers 510 can be circuitry for driving a touchscreen, a flat-panel display, a cathode ray tube display, a projector, a speaker or speakers, and/or any other suitable display and/or presentation devices.

Communication interface(s) 514 can be any suitable circuitry for interfacing with one or more communication networks (e.g., computer network 404). For example, interface(s) 514 can include network interface card circuitry, wireless communication circuitry, and/or any other suitable type of communication network circuitry.

Antenna 516 can be any suitable one or more antennas for wirelessly communicating with a communication network (e.g., communication network 404) in some embodiments. In some embodiments, antenna 516 can be omitted.

Bus 518 can be any suitable mechanism for communicating between two or more components 502, 504, 506, 510, and 514 in some embodiments.

Any other suitable components can be included in hardware 500 in accordance with some embodiments.

In some embodiments, at least some of the above described blocks of the process of FIG. 2 can be executed or performed in any order or sequence not limited to the order and sequence shown in and described in connection with the figure. Also, some of the above blocks of FIG. 2 can be executed or performed substantially simultaneously where appropriate or in parallel to reduce latency and processing times. Additionally or alternatively, some of the above described blocks of the process of FIG. 2 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, a container device and delivery systems for using the same are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for delivering packages, the method comprising:

receiving, at a delivery hub, at least one package to be delivered to a first recipient at a first delivery location;

actuating, by one or more processors, an automated apparatus causing a first package to be placed in a container to be delivered to the first recipient;

associating, by the one or more processors, the first package and a first container identifier of the first container with the first recipient;

determining, by the one or more processors at a first time point, whether the first container is ready to be delivered to the first recipient;

in response to determining that the first container is not ready to be delivered to the first recipient, waiting for a second package to be delivered to the first recipient;

actuating, by the one or more processors, the automated apparatus causing the second package to be placed in the first container;

associating, by the one or more processors, the second package with the first container identifier;

associating, by the one or more processors, a second container identifier of a second container with the first container identifier, wherein the second container contains at least one package to be delivered to a second recipient at a second delivery location within a particular proximity the first delivery location;

determining, by the one or more processors at a second time point, whether the first container is ready to be delivered to the first recipient and whether the second container is ready to be delivered to the second recipient; and in response to determining that the first container is ready to be delivered to the first recipient and the second container is ready to be delivered to the second recipient, causing the first container and the second container to be loaded onto a delivery vehicle using an autonomous vehicle.

2. The method of claim 1, wherein the first container has a lock associated with a password corresponding to the first recipient.

3. The method of claim 1, wherein determining, at the second time point, whether the first container is ready to be delivered to the first recipient is based on a storage temperature of the second package.

4. The method of claim 1, further comprising:

storing, in a database, the first container identifier in connection with a time at which the first container was loaded onto the delivery vehicle;

receiving information indicating that the first container has been delivered to the first recipient; and updating the database with the information indicating that the first container has been delivered to the first recipient.

5. The method of claim 4, further comprising:
receiving a request to present information associated with the first container from a user device associated with the first recipient;
retrieving information associated with the first container from the database; and
causing the information associated with the database to be presented in a user interface on the user device.

6. The method of claim 1, wherein determining, at the first time point, whether the first container is ready to be delivered to the first recipient is based on a number of packages expected for the first recipient.

7. The method of claim 1, wherein the first package and the second package are delivered to the delivery hub via different delivery services.

8. A system for delivering packages, the system comprising:
a hardware processor that:
receives, at a delivery hub, at least one package to be delivered to a first recipient at a first delivery location;
actuates an automated apparatus causing a first package to be placed in a first container to be delivered to the first recipient;
associates the first package and a first container identifier of the first container with the first recipient;
determines, at a first time point, whether the first container is ready to be delivered to the first recipient;
in response to determining that the first container is not ready to be delivered to the first recipient, waits for a second package to be delivered to the first recipient;
actuates the automated apparatus causing the second package to be placed in the first container;
associates the second package with the first container identifier;
associates a second container identifier of a second container with the first container identifier, wherein the second container contains at least one package to be delivered to a second recipient at a second delivery location within a particular proximity to a first delivery location;
determines, at a second time point, whether the first container is ready to be delivered to the first recipient and whether the second container is ready to be delivered to the second recipient; and
in response to determining that the first container is ready to be delivered to the first recipient and whether the second container is ready to be delivered to the second recipient, causes the first container and the second container to be loaded onto a delivery vehicle using an autonomous vehicle.

9. The system of claim 8, wherein the first container has a lock associated with a password corresponding to the first recipient.

10. The system of claim 8, wherein determining, at the second time point, whether the first container is ready to be delivered to the first recipient is based on a storage temperature of the second package.

11. The system of claim 8, wherein the hardware processor further:
stores, in a database, the first container identifier in connection with a time at which the first container was loaded onto the delivery vehicle;
receives information indicating that the first container has been delivered to the first recipient; and updates the database with the information indicating that the first container has been delivered to the first recipient.

12. The system of claim 11, wherein the hardware processor further:
receives a request to present information associated with the first container from a user device associated with the first recipient;
retrieves information associated with the first container from the database; and
causes the information associated with the database to be presented in a user interface on the user device.

13. The system of claim 8, wherein determining, at the first time point, whether the first container is ready to be delivered to the first recipient is based on a number of packages expected for the first recipient.

14. The system of claim 8, wherein the first package and the second package are delivered to the delivery hub via different delivery services.

15. A non-transitory computer-readable medium containing computer executable instructions that, when executed by a processor, cause the processor to perform a method for delivering packages, the method comprising:
receiving, at a delivery hub, at least one package to be delivered to a first recipient
actuating an automated apparatus causing a first package to be placed in a container to be delivered to the first recipient;
associating the first package and a first container identifier of the container with the first recipient;
determining, at a first time point, whether the first container is ready to be delivered to the first recipient;
in response to determining that the first container is not ready to be delivered to the first recipient, waiting for a second package to be delivered to the first recipient;
actuating the automated apparatus causing the second package to be placed in the first container;
associating the second package with the first container identifier, wherein the second identifier is different than the first identifier;
associating a second container identifier of a second container with the first container identifier, wherein the second container contains at least one package to be delivered to a second recipient at a second delivery location within a particular proximity to the first delivery location;
determining, at a second time point, whether the first container is ready to be delivered to the first recipient and whether the second container is ready to be delivered to the second recipient; and
in response to determining that the first container is ready to be delivered to the first recipient and the second container is ready to be delivered to the second recipient, causing the first container and the second container to be loaded onto a delivery vehicle using an autonomous vehicle.

16. The non-transitory computer-readable medium of claim 15, wherein determining, at the second time point, whether the first container is ready to be delivered to the first recipient is based on a storage temperature of the second package.

17. The non-transitory computer-readable medium of claim 15, wherein the method further comprises:
storing, in a database, the first container identifier in connection with a time at which the first container was loaded onto the delivery vehicle;

receiving information indicating that the first container has been delivered to the first recipient; and updating the database with the information indicating that the first container has been delivered to the first recipient.

18. The non-transitory computer-readable medium of claim 17, wherein the method further comprises:

receiving a request to present information associated with the first container from a user device associated with the first recipient;

retrieving information associated with the first container from the database; and causing the information associated with the database to be presented in a user interface on the user device.

19. The non-transitory computer-readable medium of claim 15, wherein determining, at the first time point, whether the first container is ready to be delivered to the first recipient is based on a number of packages expected for the first recipient.

20. The non-transitory computer-readable medium of claim 15, wherein the first package and the second package are delivered to the delivery hub via different delivery services.

\* \* \* \* \*